Patented Oct. 4, 1932

1,880,557

UNITED STATES PATENT OFFICE

CHARLES S. WEBBER AND CYRIL J. STAUD, OF ROCHESTER, NEW YORK, ASSIGNORS TO EASTMAN KODAK COMPANY, OF ROCHESTER, NEW YORK, A CORPORATION OF NEW YORK

SOLVENT FOR MIXED CELLULOSE ESTERS

No Drawing.   Application filed March 18, 1929.   Serial No. 348,128.

This invention relates to solvents for mixed cellulose esters.

In our copending applications Serial Nos. 341,032, filed Feb. 18, 1929, and 342,668, filed Feb. 25, 1929 there is described a series of mixed cellulose esters. One class of these mixed cellulose esters includes a radical from the alpha hydroxy acids and an acyl radical. Examples of these mixed cellulose esters contain the lactic, tartaric, racemic, malic, glycollic, glyceric and mandelic acid radicals together with certain acyl radicals. Other poly basic alpha hydroxy acids may be present. Another group of the double esters of cellulose may be classed under the heading of acyl esters of cellulose containing the alpha and gamma ketonic acids, the latter comprising, for example, the pyruvic (alpha-keto-propionic acid), alpha-keto-butyric, alpha-keto-valeric and alpha-keto-caproic acid, or the gamma keto valeric acid, laevulinic acid. An aliphatic or aromatic acid radical may constitute the other radical in the mixed ester. These mixed cellulose esters have solubilities according to the method of their manufacture, running from acetone solubility to water solubility.

We have found that for most commercial purposes, for which these esters are adapted, the common solvents formerly known to us were not particularly suitable. A non-aqueous solvent or compound solvent, therefore, having lower boiling constituents was desirable.

It is the object of the present invention to provide a class of solvents for the hereinabove described mixed esters of cellulose, having the desired characteristics.

We have found that mixtures of ethylene chloride and monohydroxy aliphatic alcohols are suitable for this purpose. The straight or branched chain aliphatic alcohols having from one to five carbon atoms are particularly well adapted as solvents of these double esters.

The mixed esters of cellulose referred to are legion. As noted in the above patents, the solubility of each of the esters may be varied over a wide range, this change in solubility being due to more or less of the hydroxy or ketonic acid radicals being substituted for the acyl radicals. Our solvent is, therefore, not a universal solvent for all of the possible mixed cellulose esters. On the other hand, our compound solvent is suitable for all the mixed cellulose esters which have a solubility between approximately 50% aqueous-alcohol and 75% aqueous-alcohol and also the acetone soluble mixed esters.

An adequately strong and useful compound solvent may be prepared by mixing ethylene chloride with one or more of the lower monohydroxy aliphatic alcohols. By lower monohydroxy aliphatic alcohols we include those having less than five carbon atoms. While they may be mixed in varying proportions, it is noted, by way of example, that a suitable solvent can be formed by mixing from 30 to 75 parts by volume of ethylene chloride and 70 to 25 parts by volume of the alcohol and the amount of the mixed ester of cellulose dissolved in the solvent can be varied to suit the means of the manufacturer. But for the purpose of illustration, it is noted that a suitable flowable solution may be obtained by dissolving one part of the mixed cellulose ester in 4 to 8 parts by weight of the compound solvent. Other substances which impart added suppleness or incombustibility or other qualities to the composition may likewise be added.

The ingredients are of the ordinary commercial type and sufficiently purified for the process of film manufacture, for example, so as to give a dope which will yield films having the proper relative freedom from color. Various changes may be made, therefore, in the proportion of the materials employed in this compound solvent for the purpose of the invention, as well as equivalents substituted therein, the examples herein presented being merely illustrative of suitable solvents for the mixed cellulose ester.

Having thus described our invention, what we claim as new and desire to secure by Letters Patent is:

1. A flowable composition of matter, comprising a mixed cellulose acyl ester dissolved in a mixture of ethylene chloride and a lower monohydroxy aliphatic alcohol, said mixed ester being soluble in either acetone or 50–75% aqueous alcohol and having an acyl radical of an organic acid selected from the group consisting of alpha hydroxy, alpha ketonic and gamma ketonic acids.

2. A flowable composition of matter, comprising a mixed cellulose acyl ester dissolved in a mixture of ethylene chloride and a monohydroxy aliphatic alcohol containing one to five carbon atoms, said mixed ester being soluble in either acetone or 50–75% aqueous alcohol and having an acyl radical of an organic acid selected from the group consisting of alpha hydroxy, alpha ketonic and gamma ketonic acids.

3. A flowable composition of matter comprising a mixed cellulose acyl ester dissolved in a solvent mixture consisting of 75–30% of ethylene chloride and 25–70% of a lower monohydroxy alcohol, said mixed ester being soluble in either acetone or 50–75% aqueous alcohol and having an acyl radical of an organic acid selected from the group consisting of the alpha hydroxy, alpha ketonic and gamma ketonic acids.

4. A flowable composition of matter comprising a mixed cellulose acyl ester dissolved in a solvent mixture consisting of 75–30% of ethylene chloride and 25–70% of a monohydroxy alcohol containing one to five carbon atoms, said mixed ester being soluble in either acetone or 50–75% aqueous alcohol and having an acyl radical of an organic acid selected from the group consisting of the alpha hydroxy, alpha ketonic and gamma ketonic acids.

5. A flowable composition of matter comprising a cellulose acetate-acylate dissolved in a mixture of ethylene chloride and a lower monohydroxy aliphatic alcohol, the acyl radical of the ester being from an organic acid selected from the group consisting of alpha hydroxy, alpha ketonic and gamma ketonic acids.

6. A flowable composition of matter comprising ethylene chloride and a lower monohydroxy aliphatic alcohol in which is dissolved a mixed ester of cellulose selected from the group consisting of cellulose acetate-lactate, cellulose acetate-tartrate, cellulose acetate-racemate, cellulose acetate-malate, cellulose acetate-glycollate, cellulose acetate-glycerate and cellulose acetate-mandelate, said ester being soluble in either acetone or 50–75% aqueous alcohol.

7. A flowable composition of matter comprising a cellulose acetate-lactate dissolved in a solvent mixture comprising ethylene chloride and a lower monohydroxy aliphatic alcohol.

8. A flowable composition of matter comprising a cellulose acetate-lactate dissolved in a solvent mixture comprising ethylene chloride and a lower monohydroxy aliphatic alcohol, and a plasticizer.

9. A flowable composition of matter comprising a cellulose acetate-tartrate dissolved in a solvent mixture comprising ethylene chloride and a lower monohydroxy aliphatic alcohol.

10. A flowable composition of matter comprising a cellulose acetate-mandelate dissolved in a solvent mixture comprising ethylene chloride and a lower monohydroxy aliphatic acid.

Signed at Rochester, New York, this 9th day of March 1929.

CYRIL J. STAUD.
CHARLES S. WEBBER.